United States Patent
Yang et al.

(10) Patent No.: US 10,979,712 B2
(45) Date of Patent: Apr. 13, 2021

(54) BLOCK-BASED VIDEO DECODING METHOD USING PRE-SCAN AND APPARATUS THEREOF

(71) Applicant: CHIPS & MEDIA, INC, Seoul (KR)

(72) Inventors: Sung Mo Yang, Yongin-si (KR); Jung Tae Kim, Cheonan-si (KR); Kwang Hyun Choi, Seoul (KR); Jin Seon Youn, Seoul (KR); Dong Gyu Kim, Seoul (KR)

(73) Assignee: CHIPS & MEDIA, INC, Seoul (KR)

( * ) Notice: Subject to any disclaimer, the term of this patent is extended or adjusted under 35 U.S.C. 154(b) by 0 days.

(21) Appl. No.: 16/488,079

(22) PCT Filed: Feb. 27, 2018

(86) PCT No.: PCT/KR2018/002414
§ 371 (c)(1),
(2) Date: Aug. 22, 2019

(87) PCT Pub. No.: WO2018/159987
PCT Pub. Date: Sep. 7, 2018

(65) Prior Publication Data
US 2020/0068198 A1 Feb. 27, 2020

(30) Foreign Application Priority Data
Mar. 3, 2017 (KR) .......... 10-2017-0027562

(51) Int. Cl.
*H04N 19/129* (2014.01)
*H04N 19/117* (2014.01)
(Continued)

(52) U.S. Cl.
CPC ......... *H04N 19/129* (2014.11); *H04N 19/117* (2014.11); *H04N 19/176* (2014.11);
(Continued)

(58) Field of Classification Search
CPC .. H04N 19/129; H04N 19/117; H04N 19/176; H04N 19/184; H04N 19/44; H04N 19/593
See application file for complete search history.

(56) References Cited

U.S. PATENT DOCUMENTS

| | | | | | |
|---|---|---|---|---|---|
| 5,377,020 | A | * | 12/1994 | Smitt | G06K 9/38 358/3.14 |
| 2002/0085767 | A1 | * | 7/2002 | Epstein | G06Q 50/08 382/246 |

(Continued)

FOREIGN PATENT DOCUMENTS

| | | |
|---|---|---|
| JP | 2015-012410 A | 1/2015 |
| KR | 10-2006-0025528 A | 3/2006 |

(Continued)

*Primary Examiner* — Jonathan R Messmore
(74) *Attorney, Agent, or Firm* — Novick, Kim & Lee, PLLC; Sang Ho Lee

(57) ABSTRACT

Provided are a block based video decoding method and an apparatus thereof, the method includes receiving a bitstream; generating a prescan information corresponding to a picture unit image from the bitstream; and decoding the picture unit image of the bitstream using the prescan information. The bitstream includes the image information in which the picture unit image is divided into one or more coding unit and sequentially block-coded according to a predetermined order in the coding unit, and the decoding comprising processing a block decoding in accordance with the predetermined order in the intra-picture in a non-dependent manner with an encoding order in an intra-coding unit using the prescan information.

14 Claims, 10 Drawing Sheets

(51) Int. Cl.
*H04N 19/176* (2014.01)
*H04N 19/184* (2014.01)
*H04N 19/44* (2014.01)
*H04N 19/593* (2014.01)

(52) U.S. Cl.
CPC ........... *H04N 19/184* (2014.11); *H04N 19/44* (2014.11); *H04N 19/593* (2014.11)

(56) References Cited

U.S. PATENT DOCUMENTS

| | | | |
|---|---|---|---|
| 2005/0123274 A1* | 6/2005 | Crinon | H04N 21/8455 386/241 |
| 2011/0080948 A1* | 4/2011 | Chen | H04N 19/44 375/240.12 |
| 2014/0247875 A1 | 9/2014 | Hattori et al. | |
| 2015/0341642 A1* | 11/2015 | Hendry | H04N 19/91 375/240.02 |
| 2019/0141317 A1* | 5/2019 | Heo | H04N 19/176 |

FOREIGN PATENT DOCUMENTS

| | | |
|---|---|---|
| KR | 10-2014-0130274 A | 11/2014 |
| KR | 10-2016-0101041 A | 8/2016 |

\* cited by examiner

BLOCK-BASED VIDEO DECODING METHOD USING PRE-SCAN AND APPARATUS THEREOF

TECHNICAL FIELD

The present invention relates to video decoding, and more particularly to a video decoding method and apparatus for providing block-based video decoding using prescan.

BACKGROUND ART

Recently, the demand for high-resolution and high-quality images such as HD (High Definition) image and UHD (Ultra High Definition) image has been increasing in various application fields.

The more the image data has high resolution and high quality, the amount of data is increased relative to the conventional image data, in the cases of transmitting the image data using a medium such as a conventional wired/wireless broadband line or storing using an existing storage medium, transmission costs and storage costs may be increased.

High efficiency image compression techniques can be utilized to solve such problems as the image data becomes high resolution and high quality.

There are various image compression technologies such as an inter-picture prediction technique for predicting a pixel value included in a current picture from a previous or a subsequent picture of the current picture, an intra-picture prediction technique for predicting a pixel value included in the current picture using pixel information in the current picture, an entropy encoding technique for assigning a short code to a value having a high appearance frequency and assigning a long code to a value having a low appearance frequency, and the image data can be effectively compressed to transmit or store by using these image compression technologies.

In order to cost-effectively response with various resolutions, frame rates, etc. according to such this application, it is necessary to have a video decoding apparatus which can be easily processed according to the performance and function required in the application.

In particular, for such the application, the video decoding apparatus can treat encoding units of various sizes as a block basis which divided an entire picture corresponding to one frame. In particular, a coding unit (e.g., a rectangular-shaped tile) having different sizes may exist in one picture, and the coding unit may include large blocks including one or more coding units, prediction units, and transform units that having a quad-tree structure. Such the large block may be referred to as a super block, and each super block is generally encoded and decoded sequentially in a raster scan order within one tile.

However, in decoding one picture, when the picture is scanned by the decoding unit such as the tile obtained by dividing the picture, there is an inefficiency in processing pipeline decoding of the picture unit. That is, for example, even if each tile decodes a bit stream encoded in the raster scan order by a whole picture unit, as a result, independent decoding is performed for each tile, and the efficiency may be low. In particular, there is a problem in that it can not be used normally, even in an environment where the decoder is capable of image buffering and processing in picture units according to improve the hardware performance.

In addition, time synchronization and prediction thereof in which each picture is decoded entirely are difficult, and the processing time may be increased inefficiently. As a result, the latency may be increased in the pipeline decoding on a picture unit, or the entire decoding time becomes longer.

This is a factor causing a very large restriction in implementing a picture-based pipelined decoder for various standard-type video encoding considering the encoding unit and the blocks contained therein that are raster scanned separately in the picture such as an emerging HEVC standard methods or VP9 and HEVC-advance.

Therefore, it is increased the need for a decoding apparatus which can treat sequentially the decoding on a row unit on the basis of the picture unit or the entire picture by directly decoding all the blocks in the picture in the raster scanning order regardless of depending on the division structure of the tile and the like.

DISCLOSURE

Technical Problem

The present invention has been made to solve the above problems, and an object of the present invention is to provide an image decoding apparatus and a method thereof, which can perform the raster scan decoding process according to the intra-picture block order regardless of depending on a coding unit, and facilitate decoding and pipeline processing based on a picture unit by providing a prescan corresponding to the coding unit obtained by dividing a picture of a bitstream in the block-based video decoding process.

Technical Solution

According to an aspect of the present invention, there is provided a block based video decoding method, comprising: receiving a bitstream; generating a prescan information corresponding to a picture unit image from the bitstream; and decoding the picture unit image of the bitstream using the prescan information, wherein the bitstream includes the image information in which the picture unit image is divided into one or more coding unit and sequentially block-coded according to a predetermined order in the coding unit, the decoding comprising processing a block decoding in accordance with the predetermined order in the intra-picture in a non-dependent manner with an encoding order in an intra-coding unit using the prescan information.

According to other aspect of the present invention, there is provided an block based video decoding apparatus, comprising: a prescan module for receiving a bitstream, and generating a prescan information corresponding to a picture unit image from the bitstream; and a decoding module for decoding the picture unit image of the bitstream using the prescan information, wherein the bitstream includes the image information in which the picture unit image is divided into one or more coding unit and sequentially block-coded according to a predetermined order in the coding unit, wherein the decoding module processes a block decoding in accordance with the predetermined order in the intra-picture in a non-dependent manner with an encoding order in an intra-coding unit using the prescan information.

According to another aspect of the present invention, there is provided a computer readable storage medium storing a program for causing a computer to execute the method.

Advantageous effects

According to an embodiment of the present invention, a video decoding apparatus and a method thereof have effects to perform the raster scan decoding process according to the intra-picture block order regardless of depending on a coding unit, and to facilitate decoding and pipeline processing based on a picture unit by providing a prescan corresponding to the coding unit obtained by dividing a picture of a bitstream in the block-based video decoding process.

BEST MODE

Hereinafter, embodiments of the present invention will be described in detail with reference to the drawings. In the following description of the embodiments of the present invention, a detailed description of known functions and configurations incorporated herein will be omitted when it may make the subject matter of the present disclosure rather unclear.

It is to be understood that when an element is referred to as being "linked" or " connected" to another element, it may be directly linked or connected to the other element. In addition, the description of "including" a specific configuration in the present invention does not exclude a configuration other than the configuration, and means that additional configurations can be included in the scope of the present invention or the scope of the present invention.

The terms first, second, etc. may be used to describe various elements, but the elements should not be limited by the terms. The terms are used only for the purpose of distinguishing one component from another. For example, without departing from the scope of the present invention, the first component may be referred to as a second component, and similarly, the second component may also be referred to as a first component.

In addition, the components shown in the embodiments of the present invention are shown separately to represent different characteristic functions, it does not mean that each component consists of separate hardware or a single software unit. That is, the respective constituent parts are listed in the respective constituent parts for convenience of explanation, at least two constituent parts of the respective constituent parts are combined to form one constituent part, one constituent part can be divided into a plurality of constituent parts to perform a function. The integrated embodiments and the separate embodiments of each of these components are also included in the scope of the present invention without departing from the essence of the present invention.

In addition, some of the elements are not essential elements for performing essential functions in the present invention, but may be optional elements for improving performance. The present invention can be implemented only with components that are essential for realizing the essence of the present invention except for the components used for the performance enhancement, a structure including only essential components other than the optional components used for merely improving the performance is also included in the scope of the present invention.

Figure 1:
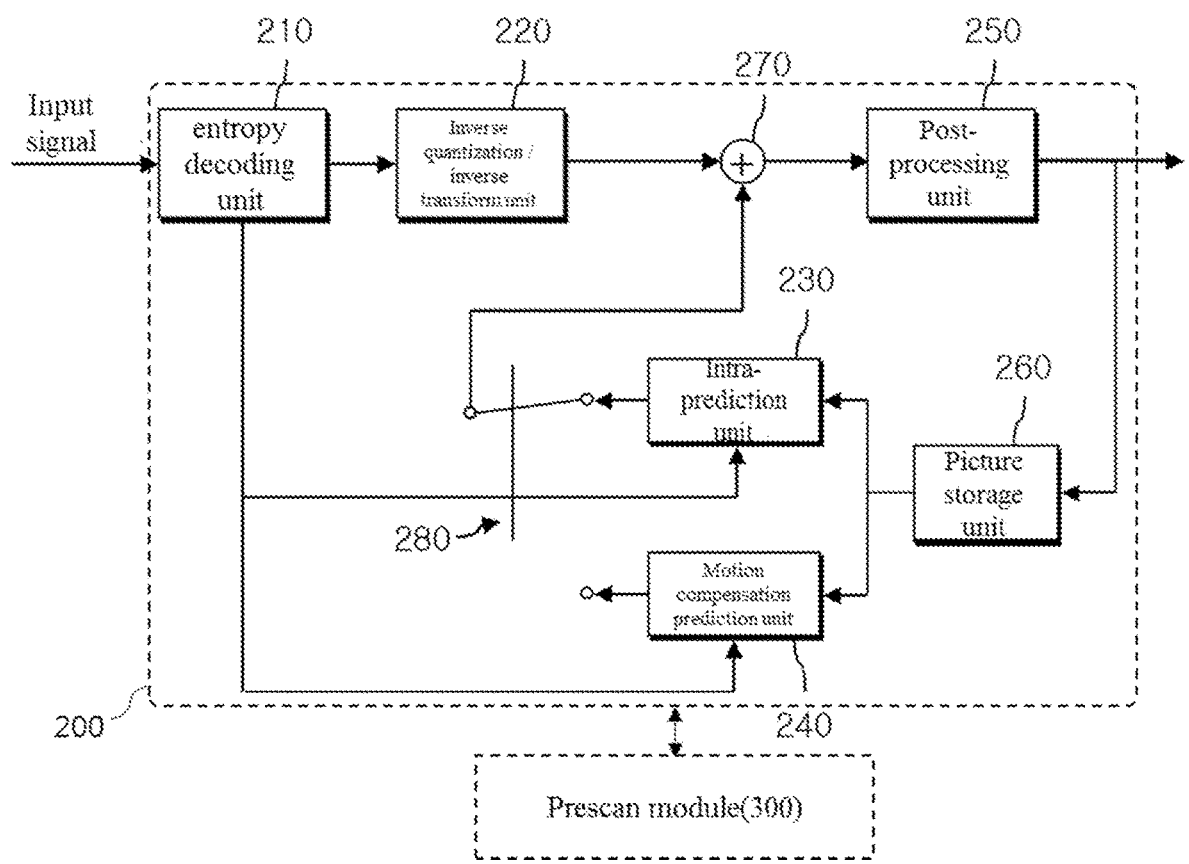
FIG. 1 is a block diagram illustrating a decoding apparatus according to an embodiment of the present invention.

FIG. 1 is a block diagram illustrating a decoding apparatus according to an embodiment of the present invention.

A decoding apparatus 20 according to an embodiment of the present invention may include one or more decoding modules 200, and the decoding module 200 extracts information necessary for decoding from the image bitstream of the picture unit identified from the input signal and performs sequentially decoding processing on the blocks in the picture based on the extracted information. Here, the sequential decoding process can be exemplified by a raster scan order between blocks in the input image unit, and various orders may be exemplified.

However, when each block is coded, a residual signal may be generated based on the data of the blocks previously coded by the scanning order in the coding unit. As a result, like the picture corresponding to one frame, the image unit to be processed is divided into a predetermined coding unit (for example, a tile or the like) and encoded in the order in each coding unit.

However, as described above, in sequential decoding based on the image unit such as the picture, a normal reference block cannot be identified at the boundary of an encoding unit such as the tile, this results in a problem that the normal decoding cannot be performed.

To solve this problem, the decoding module 200 according to the embodiment of the present invention enables continuous decoding by referring to the necessary information at the encoding unit boundary from the prescan information by interworking with a prescan module 300 located inside or outside the decoding apparatus 20 and connected to the components of the decoding module 200. This will be described in more detail with reference to FIG. 3, first, the basic operation of the decoding module 200 will be described.

The decoding module 200 according to the embodiment of the present invention includes an entropy decoding unit 210, an inverse quantization/inverse transform unit 220, an adder 270, a post-processing unit 250, a picture storage unit 260, an intra-prediction unit 230, a motion compensation prediction unit 240, and an intra/inter selection switch 280, and further includes a prescan module 300, or all or some of the components of the above components may be connected to the prescan module 300.

The entropy decoding unit 210 receives and decodes the bitstream encoded by the image encoding apparatus and separates it into an intra-prediction mode index, a motion information, a quantization coefficient sequence, and transmits the decoded motion information to the motion compensation prediction unit 240.

The entropy decoding unit 210 transmits the intra-prediction mode index to the intra-prediction unit 230 and the inverse quantization/inverse transformation unit 220 and outputs the inverse quantization coefficient sequence to the inverse quantization/inverse transformation unit 220.

The inverse quantization/inverse transform unit 220 transforms the quantized coefficient sequence into an inverse quantization coefficient of the two-dimensional array, and one of a plurality of scanning patterns may be selected for the transform. For example, the scanning pattern can be selected based on the prediction mode (i.e., intra-prediction or inter-prediction) of the current block and the intra prediction mode.

The inverse quantization/inverse transform unit 220 applies the quantization matrices selected from a plurality of quantization matrices to the inverse quantization coefficients of the two-dimensional array to reconstruct the quantization coefficients.

Meanwhile, different quantization matrices are applied depending on the size of the current block to be reconstructed, the quantization matrix may be selected based on at least one of the prediction mode and the intra-prediction mode of the current block for a block of the same size.

The inverse quantization/inverse transform unit 220 inversely transforms the reconstructed quantized coefficients to reconstruct the residual blocks, the inverse transform process may be performed with the transform unit TU as a basic unit.

The adder 270 adds the residual block reconstructed by the inverse quantization/inverse transform unit 220 to the prediction block generated by the intra-prediction unit 230 or the motion compensation prediction unit 240 to reconstruct the image block.

The post-processing unit 250 performs post-processing on the reconstructed image generated by the adder 270, then the deblocking artifacts due to the image loss by the quantization process can be reduced and compensated.

Here, the post-processing unit 250 may perform a deblocking filtering process for removing the blocking effect generated in the reconstructed picture, a sample adaptive offset SAO application process for compensating the difference value with respect to the original image in units of pixels, and an adaptive loop filtering ALF process for compensating the difference value with the original image as a coding unit.

The picture storage unit 260 is a frame memory for storing a local decoded picture subjected to post-processing by the post-processing unit 250.

The intra predictor 230 reconstructs the intra-prediction mode of the current block and generates the prediction block according to the reconstructed intra-prediction mode based on the intra-prediction mode index received from the entropy decoding unit 210.

The motion compensation prediction unit 240 generates the prediction block for the current block from the picture stored in the picture storage unit 260 based on the motion vector information, when the motion compensation with a small number of precision is applied, the prediction block can be generated by applying the selected interpolation filter.

The intra/inter selection switch 280 provides the adder 270 with a prediction block generated in either the intra prediction unit 230 or the motion compensation prediction unit 240 based on the coding mode.

Figure 2:
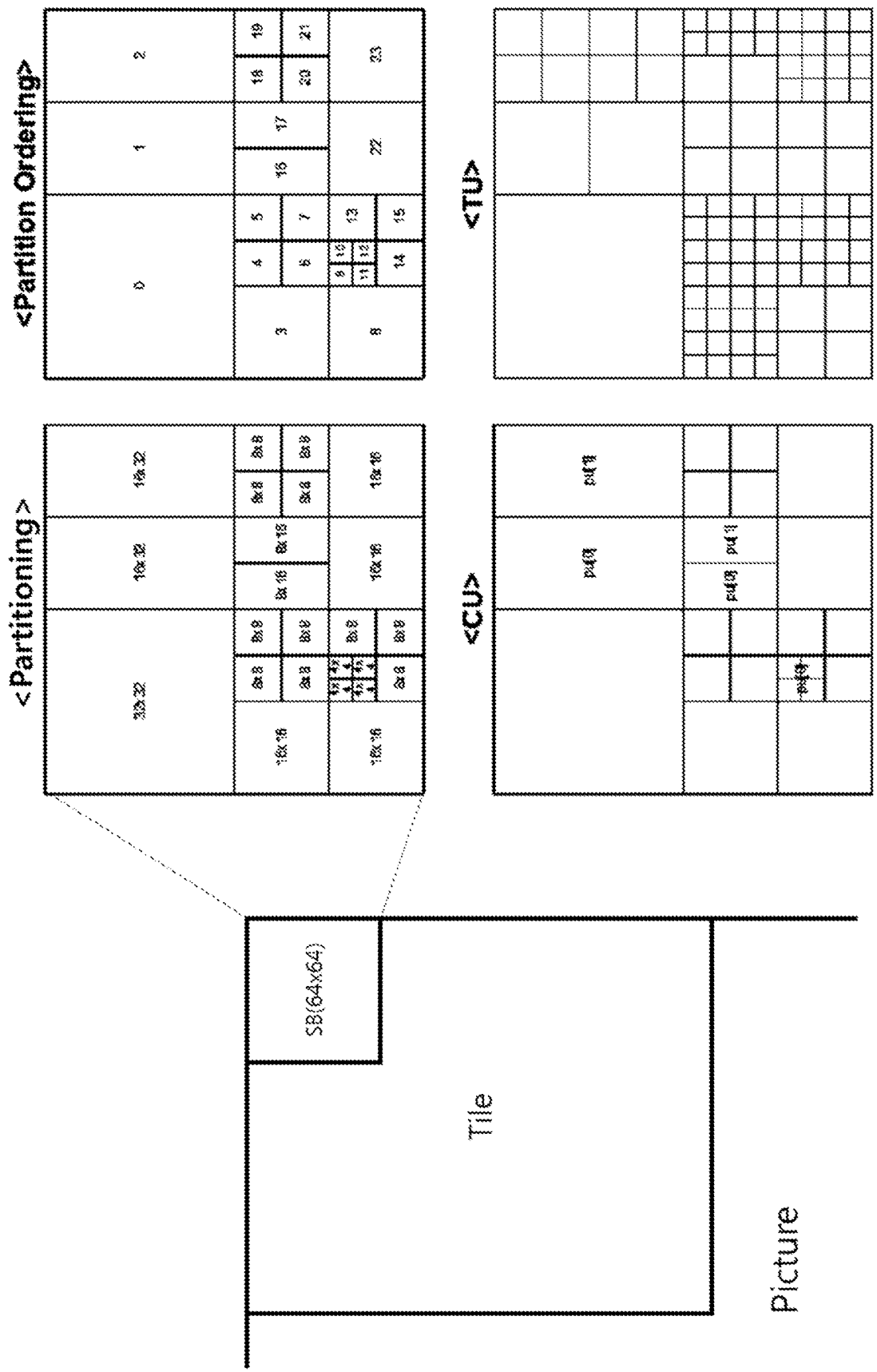
FIG. 2 is a view for explaining an embodiment of a method of dividing and processing an image into coding units.

FIG. 2 is a view for explaining an embodiment of a method of dividing and processing the image into coding units.

In the embodiment of the present invention, the picture of the image may be composed of tiles which are a plurality of coding units. However, the basic unit for dividing the picture and the tile may differ depending on which standard, such as HEVC or VP9, is used as the encoding codec of the video stream. However, in the embodiment of the present invention, the tile structure applicable to VP9 and the large block unit structure having a pixel size of 64×64 or more are illustrated, Therefore, the application efficiency of the present invention to the bit stream encoded preferably by the VP9 method may be higher.

For example, the tile is a basic unit of encoding, and can be divided into a plurality of super blocks SB, which are large blocks, and the division may be performed sequentially in the order as shown in FIG. 2.

The super block may be divided into one or two or more coding units CUs, which are basic units for performing the inter-prediction or the intra-prediction.

The coding unit CU may be divided into one or more prediction units PU, which are basic units on which prediction is performed.

In this case, the encoding apparatus and the decoding module 200 determine one of the inter prediction and intra prediction as a prediction method for each of the divided coding units CUs, but it is also possible to generate prediction blocks differently for each prediction unit PU.

On the other hand, the coding unit CU may be divided into one or two or more transform units TUs, which are basic units in which the transform to the residual block is performed.

Referring to FIG. 2, the large block is divided into a quad tree structure, and may be divided into a plurality of coding units CUs having the form of the square, the coding units may be divided into one or more prediction units PU, and the transform unit TU for transformation.

In this way, each of the coding units CU having the square shape can be divided into quad tree structures, as described above, the depth of the coding unit CU divided into the quad tree structure may have an integer value from 0 to 3.

Also, the large block may be referred to as a super block, each superblock can be recursively subdivided to the minimum size of 4×4.

In addition, even in the quad-tree structure, it is possible to allow horizontal or vertical division in a specific encoding mode. However, if there is only the division in the horizontal or vertical direction in the coding unit, the re-division may be terminated.

The picture of the image having such the structure is generally coded sequentially in units of large blocks in the tile, the decoding module 200 has a structure that is not suitable for sequential decoding on the picture unit. Therefore, according to the embodiment of the present invention, it is possible to solve this problem by providing the information necessary for the sequential decoding of each picture unit by the row in cooperation with the prescan module 300 to be described later.

Figure 3:
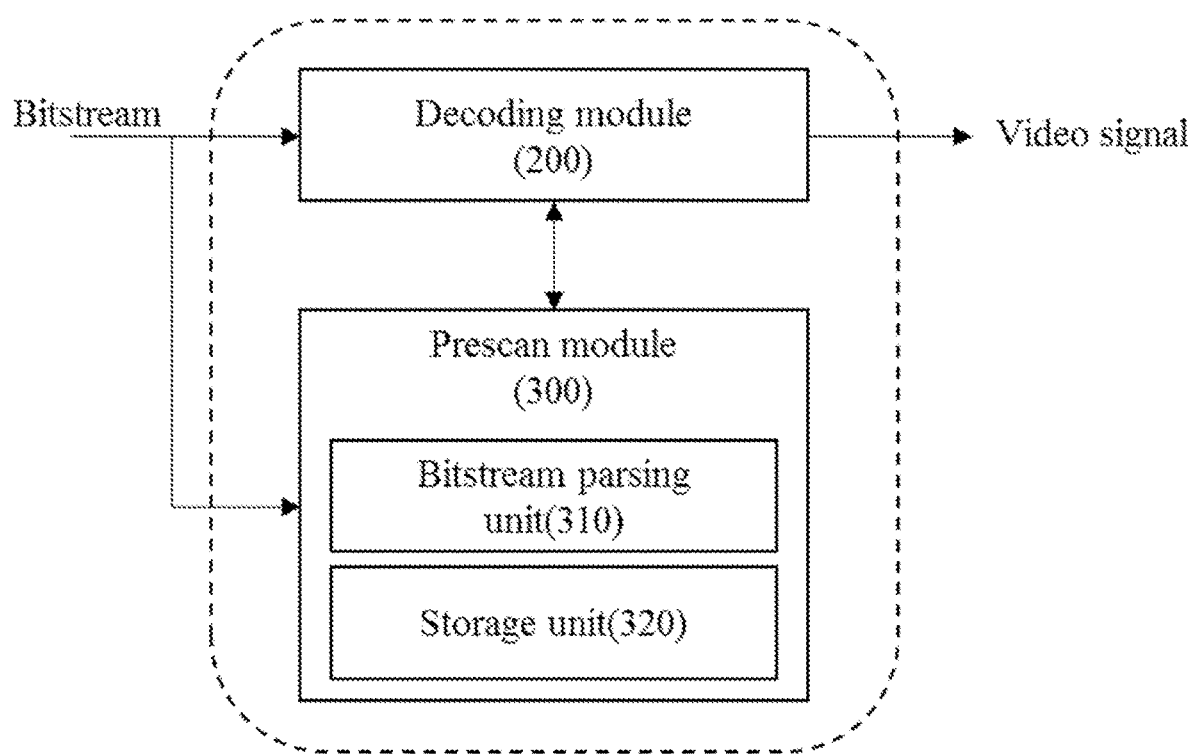
FIG. 3 is a view for illustrating a decoding apparatus including prescan module according to an embodiment of the present invention.

FIG. 3 is a view for illustrating the decoding apparatus including prescan module according to the embodiment of the present invention.

Referring to FIG. 3, the decoding apparatus 20 according to the embodiment of the present invention includes the prescan module 300 and the decoding module 200, the prescan module 300 may include a bitstream parsing unit 310 and a storage unit 320.

In this case, the decoding module 200 may perform sequential decoding processing on a row unit for the entire picture, for example, in a raster scan order in cooperation with the prescan module 300.

For this, the prescan module 300 parses the input bit stream to perform prescan, the prescan information corresponding to the position of the prescan unit (for example, starting the row unit in the tile) can be obtained and stored in advance. In addition, the prescan module 300 may generate and store the prescan information corresponding to the prescan unit position by performing the bit stream parsing and simplified entropy decoding (e.g., entropy decoding processing for extracting only scram information)

The prescan information stored by the prescan module 300 may correspond to the specific location in the encoding unit, and it is included at least one of context information, bitstream location information, location information within the large block SB, and additional information.

In addition, the prescan position may correspond to a row start position in each tile in order to process in a row unit for the entire picture. Therefore, the prescan position can be predetermined according to the position where the row of each tile starts, the boundary position between the tiles, or the row start position in the row of each picture.

The prescan module 300 pre-extracts and stores prescan information for each prescan position in advance, so that the decoding module 200 enables decoding of the raster scan order for the entire picture without depending on the tile unit. Accordingly, the decoding module 200 can perform seamless decoding based on prescan information stored in advance.

That is, the decoding module 200 may process the block decoding sequentially according to the order in the picture unit in a non-interrelated manner using the prescan information.

In addition, the decoding apparatus 20 may control the synchronization and the clock between the decoding modules 200 in accordance with the encoding structure information previously obtained from the prescan module 300, so that it is possible to control the operation timing adjustment and output at the frame or picture level.

Figure 4:
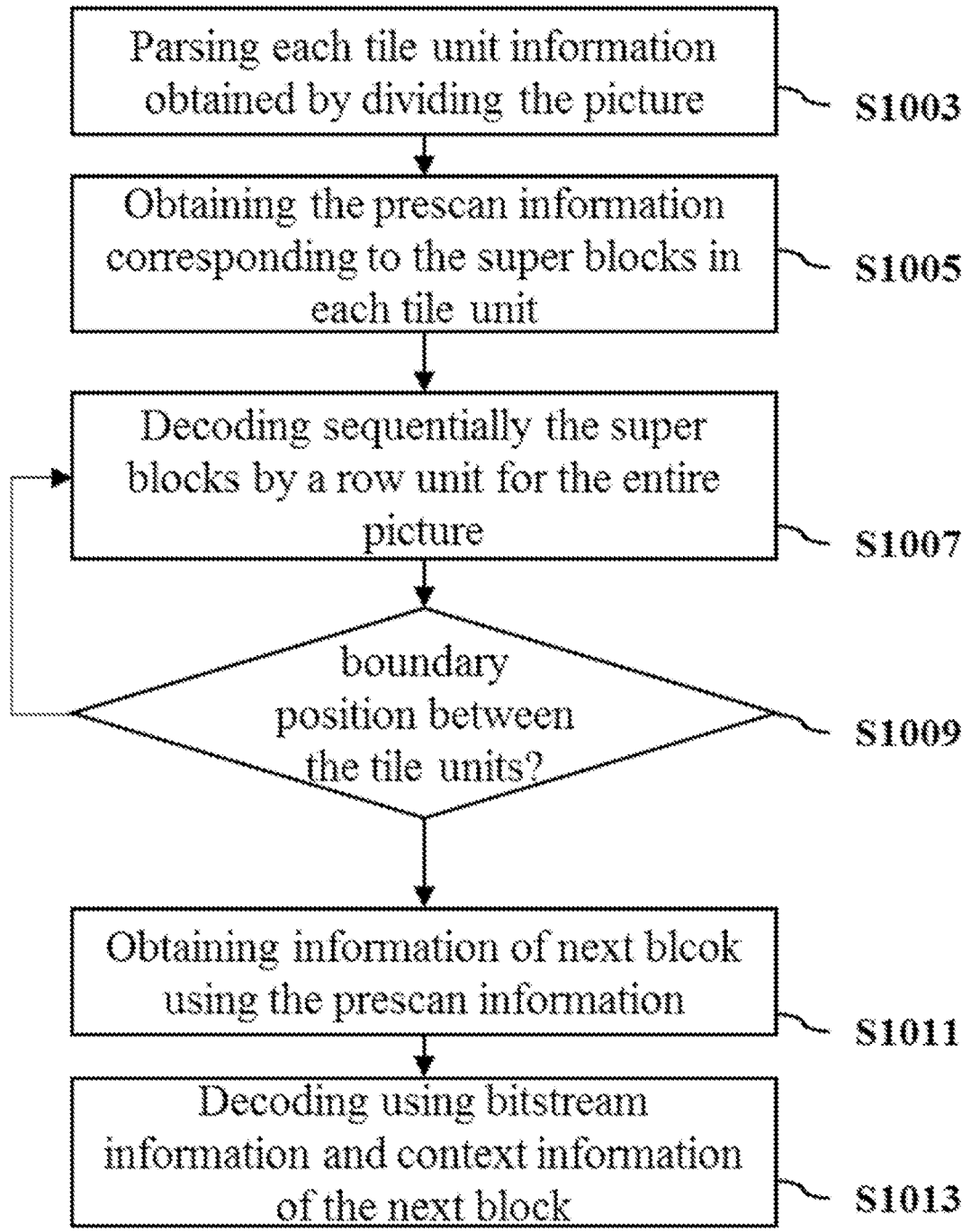
FIG. 4 is a flowchart illustrating an operation of a decoding apparatus including a prescan module according to an embodiment of the present invention.
Figure 5:
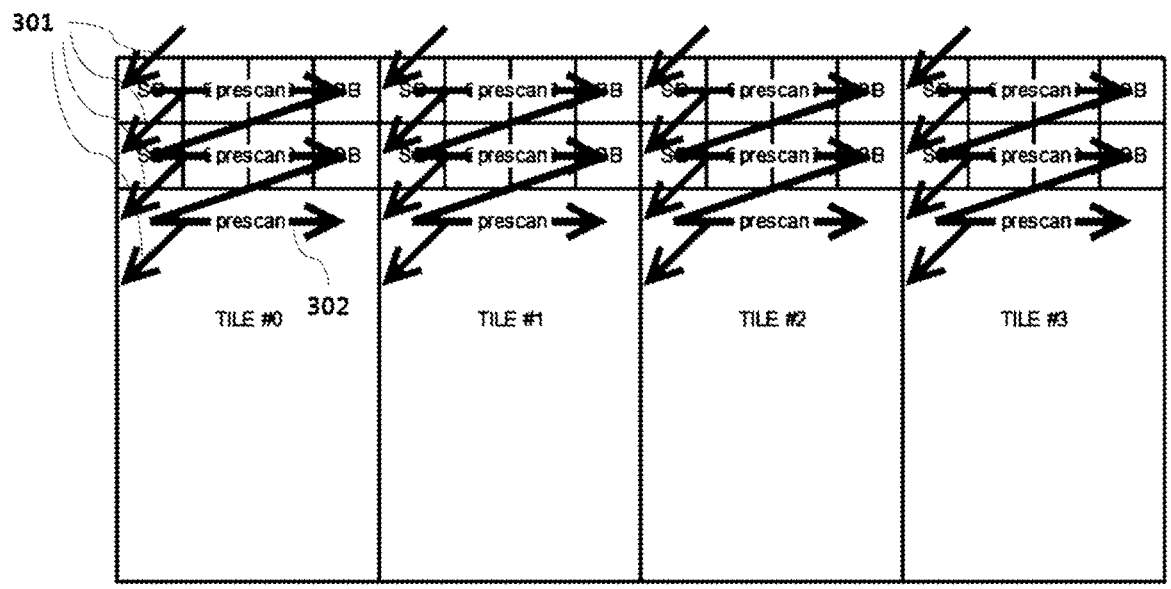
FIG. 5 is a view for explaining a prescan process according to an embodiment of the present invention.
Figure 6:
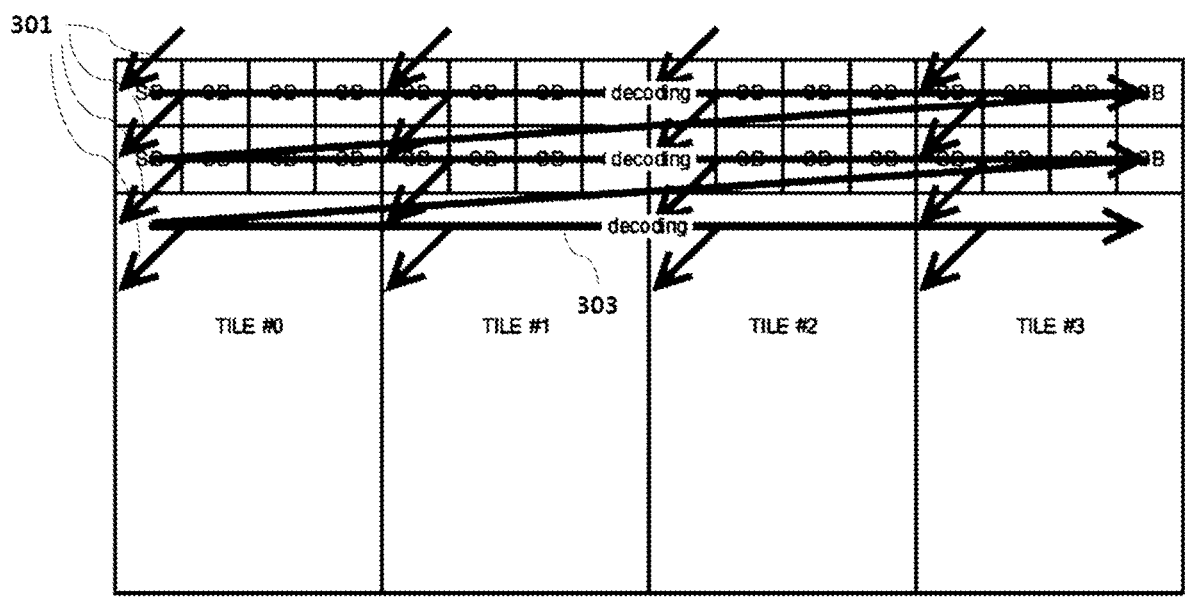
FIG. 6 is a view for explaining a prescanning and decoding process according to an embodiment of the present invention.

FIG. 4 is a flowchart illustrating an operation of the decoding apparatus including the prescan module according to the embodiment of the present invention, FIG. 5 is a view for explaining the prescan process according to the embodiment of the present invention, and FIG. 6 is a view for explaining the prescanning and decoding process according to the embodiment of the present invention.

The prescan and decoding process according to the embodiment of the present invention will be described in more detail with reference to FIGS. 4 to 6.

First, the prescan module 300 parses each tile unit information formed by dividing the picture through the bitstream parsing unit 310 (S1003).

In the embodiment of the present invention as shown in FIG. 5, the tile can be exemplified as the coding unit for dividing the picture. Each tile may include the super block SB in each tile and the super blocks in the tiles can have a size of 64×64, and may be encoded in the raster scan order within each tile and transmitted from the encoder. The raster scan order in the tiles may be sequentially encoded from left to right and from top to bottom in order of each row in the tile. However, since the structure and the encoding order may differ depending on the encoding method, the present invention is not limited to the name or size of the division unit.

The bitstream parsing unit 310 may parse the tile unit information from the bitstream provided to the decoding module 200.

Accordingly, the bitstream parsing unit 310 of the prescan module 300 obtains the prescan information corresponding to the super blocks in each tile unit (S1005).

The bitstream may include uncompressed header information, compressed header information, and compressed frame data information corresponding to the header information. The bitstream parsing unit 310 obtains the picture size information identified from the header information and the corresponding tile configuration information, identifies location information in the bitstream of the super blocks according to the tile configuration information, and may store in the storage unit 320 as the prescan information by obtaining context information on the super block at a predetermined location among the super blocks.

Accordingly, the tile structure information of the prescanned picture from the bit stream, the position information in the bit stream of the predetermined super block, and the corresponding context information may be matched and stored in the storage unit 320, respectively.

As shown in FIG. 5, the order in which the prescan proceeds may be the same as the encoding order of the bit stream. Accordingly, the prescan direction (arrow 302) can be processed in the raster scan order within each tile. In addition, as shown in FIG. 6, such the prescan is for providing picture-level sequential decoding of the decoding module 200, and the decoding module 200 may process seamless raster scan decoding for the entire picture without considering the tile structure.

To this end, while the prescan information is extracted in the prescan direction 302, the stream position information of the super block corresponding to the boundary position (arrow 301) corresponding to the boundary between the tiles and the corresponding context information may be stored in the storage unit 320.

Then, the decoding module 200 decodes sequentially the super blocks by a row unit for the entire picture on the basis of the prescanned information (S1007).

As shown in FIG. 6, the decoding module 200 can identify the tile boundary position (arrow 301) in the entire picture according to the tile structure information received from the prescan module 300, it is possible to process the decoding in the raster scan direction (arrow 303) for the entire picture according to the prescan information.

Also, the decoding module 200 determines whether it is the boundary position between tile units (S1009), when decoding at the boundary position, the information of the super block corresponding to the next block to be processed in the current row can be obtained using the prescan information (S1001).

Accordingly, the decoding module 200 can obtain the bitstream location of the block next to the boundary position and the corresponding context information from the storage unit 320, and the row unit decoding based on this can be continued sequentially (S1013).

Thus, the decoding module 200 is capable of continuous decoding at the picture level regardless of the tile structure and boundaries by performing the decoding process in the decoding module 200 based on the prescan information after the prescan phase for the specific picture unit image information.

Figure 7:
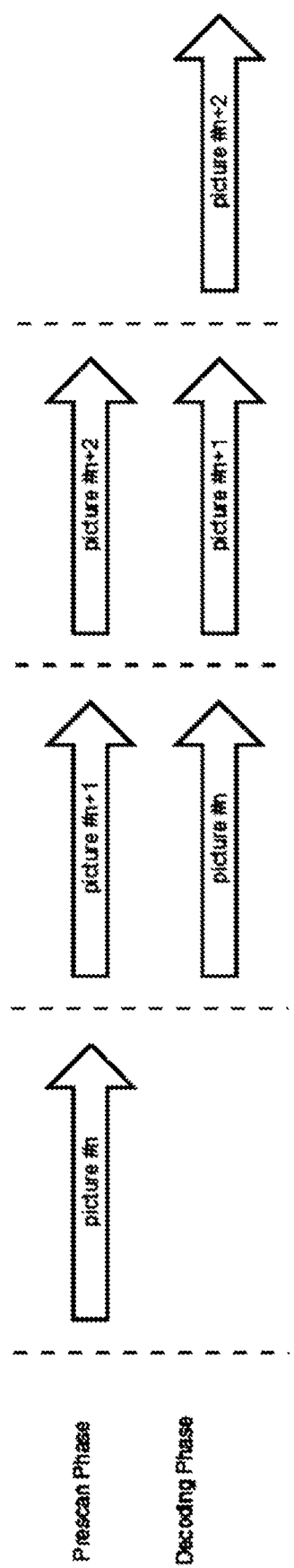
FIG. 7 is a view for explaining a picture-based pipeline decoding process according to an embodiment of the present invention.

FIG. 7 is a view for explaining a picture-based pipeline decoding process according to the embodiment of the present invention.

As shown in FIG. 7, as the decoding module 200 may perform sequentially the decoding on a picture unit, so that the pipeline processing can be performed for each picture unit. Also, the prescan module 300 first carries out the prescan process on the picture n, the decoding module 200 may process the decoded picture n that has been prescanned. Thus, while the prescan module 300 processes the picture n+1 in the pipeline operation, the decoding module 200 may be pipeline-synchronized to processing the picture n, thus, the sequential pipeline image decoding process for each picture becomes easy.

Figure 8:
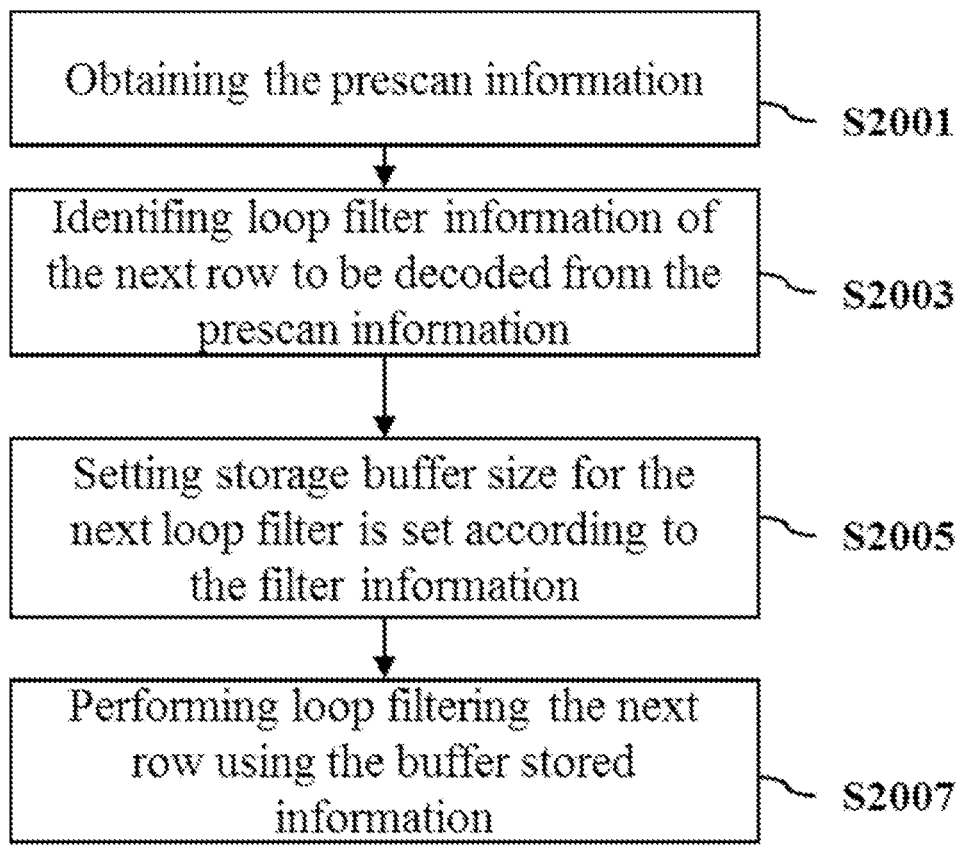
FIGS. 8 to 10 are views for explaining a loop filtering operation of a decoding apparatus including a prescan module according to another embodiment of the present invention.
Figure 9:
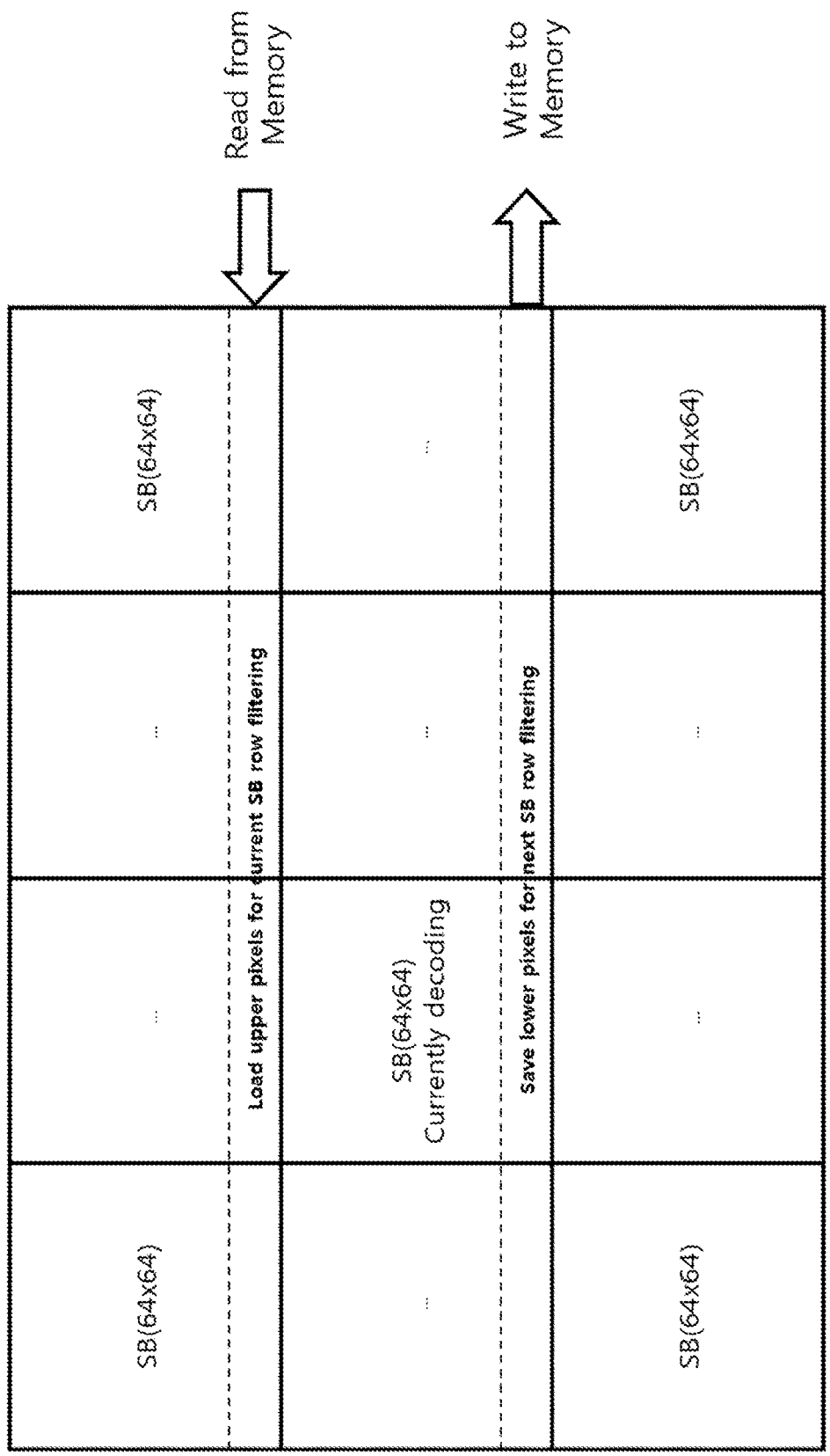
Figure 10:
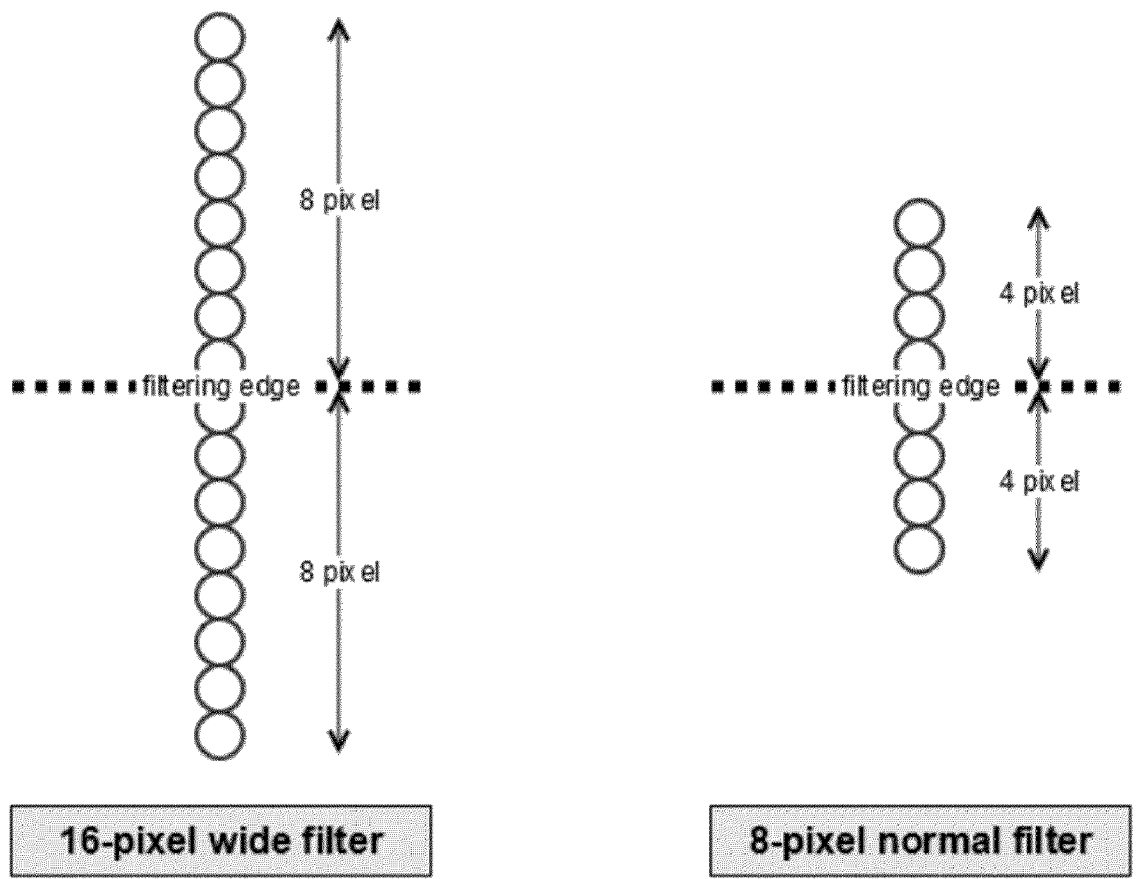

FIGS. 8 to 10 are diagrams for explaining a loop filtering operation of the decoding apparatus including the prescan module according to another embodiment of the present invention.

The decoding module 200 according to another embodiment of the present invention can reduce the storage capacity and increase the bandwidth efficiency in the loop filter processed in the post-processing unit 250 by using the prescan information.

Referring to FIG. 8, the decoding module 200 obtains the prescan information from the prescan module 300 (S2001).

Here, the prescan information may include tap unit information of a filter corresponding to a row unit of a picture or a whole unit of a picture. For example, in a loop filter such as a deblocking filter, based on the filtering edge, a 16 pixel filter is applied to an wide filter or an 8 pixel filter is applied to a regular filter, and the prescan information corresponding thereto can be obtained in advance through the prescan module 300.

Then, the decoding module 200 identifies loop filter information of the next row to be decoded from the prescan information (S2003), the storage buffer size for the next loop filter is set according to the filter information (S2005), and loop filtering corresponding to the next row is performed using the buffer stored information (S2007).

Referring to FIGS. 9 and 10, the number of pixels required may vary depending on the filter type as described above. Generally, since it is not known what type of filter will be applied in the next super block row SB row, the post-processing unit of the general decoder must previously store eight line information which is the maximum value for filtering of the next line.

However, as shown in FIG. 9, the decoding module 200 according to the embodiment of the present invention obtains in advance the loop filter information corresponding to the next super block row from the prescan module 300 through the post-processing module 250. Accordingly, it is possible to minimize the line information to be stored. That is, for example, if the post-processing unit 250 predicts that only four lines are required for filtering the next row from the loop filter information, only four lines, not the existing eight lines, can be stored in the picture storage unit 260.

Accordingly, not only the capacity to be stored can be reduced, but also the storage bandwidth can be reduced by half to improve the processing performance and speed.

Figure 11:
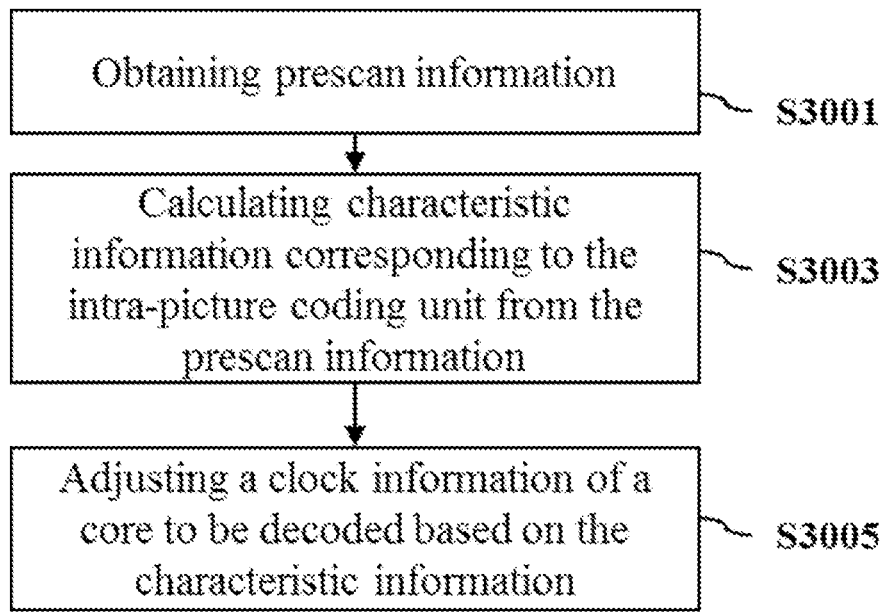
FIG. 11 is a flowchart illustrating an operation of a decoding apparatus according to another embodiment of the present invention.

FIG. 11 is a flowchart illustrating an operation of the decoding apparatus according to another embodiment of the present invention.

Referring to FIG. 11, the decoding apparatus 20 according to the embodiment of the present invention adjusts an operation clock of the decoding module 200 for decoding the picture unit according to the prescan information. To this end, the decoding apparatus 20 may further include a separate central processing unit (VCPU), not shown, and the clock speed of the decoding module 200 composed of one or more cores may be varied by the control of the central processing unit.

To this end, if the prescan module 300 obtains the prescan information (S3001), the decoding apparatus 20 calculates characteristic information corresponding to the intra-picture coding unit from the prescan information through the central processing unit (S3003), and the clock information of the core of the decoding module 200 to decode the picture is adjusted based on the calculated characteristic information (S3005).

For example, as shown in FIG. 2, the super block may be composed of the coding unit, the prediction unit and the transform unit of various shapes and sizes. Accordingly, the decoding apparatus 20 may obtain at least one of the position, number and size information of each the coding unit, the prediction unit and the transform unit from the prescan information, and the clock value optimized for the operation of the decoding module 200 can be calculated. Then, the decoding apparatus 20 can provide decoding processing with optimal efficiency by applying the calculated clock value to the core of the decoding module 200.

Figure 12:
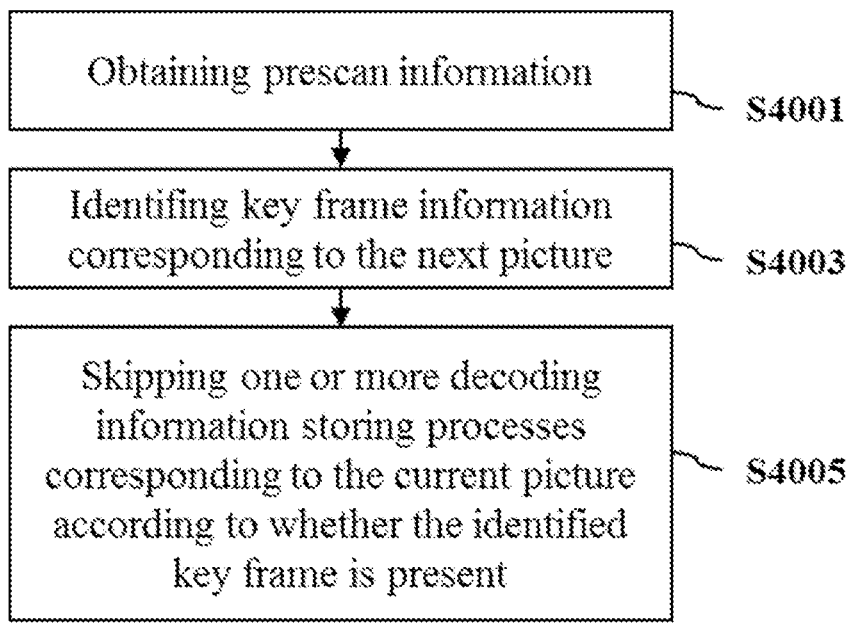
FIG. 12 is a flowchart illustrating an operation of a decoding apparatus according to another embodiment of the present invention.

Meanwhile, FIG. 12 is a flowchart illustrating an operation of the decoding apparatus according to another embodiment of the present invention.

Referring to FIG. 12, the decoding module 200 for processing the picture unit decoding according to the embodiment of the present invention may check whether the next picture is the key frame from the scan information of the prescan module 300, and one or more decoding information storing processes is skipped thereof. Accordingly, the unnecessary storage process can be reduced and the processing efficiency can be improved.

To this end, if the prescan module 300 first obtains the prescan information (S4001), the decoding module 200 identifies key frame information corresponding to the next picture from the prescan information (S4003), one or more decoding information storing processes corresponding to the current picture may be skipped according to whether the identified key frame is present (S4005).

Here, the decoding information storing process may include at least one of a backward update process, a motion vector storing process (colmv), and a segmentation feature information storing process.

First, the reverse update process includes a probability adaptation process, and it may include a series of processes for updating the probability information to be used for parsing the syntax element of the next frame based on the parsing frequency of the syntax element in the decoding process of the current frame.

And, the motion vector storing process may include a process of storing a set of motion vectors of sub-blocks of the previous frame used in the motion vector prediction process. However, since the motion vector information (colmv) is initialized in the key frame, if the decoding module 200 can know in advance that the next picture is the key frame, the motion vector information corresponding to the current frame can be skipped without being stored.

On the other hand, the segment characteristic information storing process divides the frame into segments, and a process of storing a segment ID set corresponding to the sub-block of each frame as a storage process for collectively applying decoding parameters (e.g., Qp value, loop filter strength information, reference frame information, skip flag information, etc.) corresponding to the segment unit area. However, when the next frame is the key frame, since the segment characteristic information is not used, then the decoding module 200 may skip the process of storing the segment characteristic information corresponding to the current frame if it is known in advance that the next picture is the key frame.

The method according to the present invention may be implemented as a program for execution on a computer and stored in a computer-readable recording medium. Examples of the computer-readable recording medium include a ROM, a RAM, a CD-ROM, Floppy disks, and optical data storage devices.

The computer-readable recording medium may be distributed over a networked computer system so that computer readable code can be stored and executed in a distributed manner. And, functional programs, codes and code segments for implementing the above method can be easily inferred by programmers of the technical field to which the present invention belongs.

While the present invention has been particularly shown and described with reference to exemplary embodiments thereof, it is to be understood that the invention is not limited to the disclosed exemplary embodiments, but, on the contrary, It will be understood by those skilled in the art that various changes and modifications may be made without departing from the spirit and scope of the present invention.

What is claimed is:

1. A block based video decoding method, comprising:
   receiving a bitstream;
   generating prescan information corresponding to a picture unit image from the bitstream;
   decoding the picture unit image of the bitstream using the prescan information;
   calculating intra-picture unit characteristic information from the prescan information; and
   varying core clock information of a decoding module to decode the picture image unit according to the intra-picture unit characteristic information,
   wherein the bitstream includes image information in which the picture unit image is divided into one or more coding units and sequentially block-coded according to a predetermined order in the one or more coding units, and
   wherein the decoding comprises processing a sequential block decoding in accordance with the predetermined order in the picture unit image in a non-dependent manner with an encoding order of the one or more coding units using the prescan information.

2. The block based video decoding method according to claim 1, wherein in the decoding, large blocks in the picture unit image are decoded sequentially in a row unit.

3. The block based video decoding method according to claim 2, wherein the decoding further comprises:
   obtaining position information and context information in a bitstream corresponding to a next block in a row of the picture unit image from the prescan information when a current large block corresponds to a boundary position between the one or more coding units; and
   decoding the next block based on the obtained location information and the context information.

4. The block based video decoding method according to claim 1, wherein the decoding further comprises:
   identifying filter information of a next row to be decoded from the prescan information; and
   setting a storage buffer size for a filter of the next row based on the filter information.

5. The block based video decoding method according to claim 4, wherein the filter information comprises a tap unit information of a pixel filter to be stored in the storage buffer for loop filtering.

6. The block based video decoding method according to claim 1, wherein the decoding further comprises:
   identifying key frame information corresponding to a next picture from the prescan information; and
   skipping at least one decoding information storing process corresponding to a current picture according to the key frame information.

7. The block based video decoding method according to claim 1, wherein an encoding unit of the bitstream corresponds to a tile unit, the tile unit comprises at least one super block encoded in a raster scan order, and the at least one super block is divided into one or more coding units, prediction units or transform units, and
   wherein the decoding further comprises processing the sequential block decoding in a row unit of the picture unit image or the raster scan order using the prescan information regardless of the raster scan order in the tile unit.

8. A block based video decoding apparatus, comprising:
   a prescan module for receiving a bitstream and for generating prescan information corresponding to a picture unit image from the bitstream;
   a decoding module for decoding the picture unit image of the bitstream using the prescan information;
   a central processing unit for calculating intra-picture unit characteristic information from the prescan information and for varying a core clock information of a decoding module to decode the picture image unit according to the intra-picture unit characteristic information,
   wherein the bitstream includes image information in which the picture unit image is divided into one or more coding units and sequentially block-coded according to a predetermined order in the one or more coding units, and
   wherein the decoding module processes a sequential block decoding in accordance with the predetermined order in the picture unit image in a non-dependent manner with an encoding order in of the one or more coding units using the prescan information.

9. The block based video decoding apparatus according to claim 8, wherein the decoding module sequentially decodes large blocks in the picture unit image in a row unit.

10. The block based video decoding apparatus according to claim 9, wherein the decoding module obtains position information and context information in a bitstream corresponding to a next block in a row of the picture unit image from the prescan information when a current large block corresponds to a boundary position between the one or more coding units, and decodes the next block based on the obtained location information and the context information.

11. The block based video decoding apparatus according to claim 8, wherein the decoding module identifies filter information of a next row to be decoded from the prescan information, and sets a storage buffer size for a filter of the next row based on the filter information.

12. The block based video decoding apparatus according to claim 8, wherein the decoding module identifies key frame information corresponding to a next picture from the prescan information, and skips at least one decoding information storing process corresponding to a current picture according to the key frame information.

13. The block based video decoding apparatus according to claim 8, wherein an encoding unit of the bitstream corresponds to a tile unit, the tile unit comprises at least one super block encoded in a raster scan order, and the at least one super block is divided into one or more coding units, prediction units or transform units, and wherein the decoding module processes the sequential block decoding in a row unit of the picture unit image or the raster scan order using the prescan information regardless of the raster scan order in the tile unit.

14. A computer program stored on a non-transitory medium for executing the method of claim 1 in a computer.

* * * * *